United States Patent [19]

Cheng

[11] 4,393,649
[45] Jul. 19, 1983

[54] STEAM OUTPUT CONTROL SYSTEM

[75] Inventor: Dah Yu Cheng, Los Altos, Calif.

[73] Assignee: International Power Technology, Inc., Sunnyvale, Calif.

[21] Appl. No.: 175,287

[22] Filed: Aug. 4, 1980

Related U.S. Application Data

[63] Continuation-in-part of Ser. No. 59,591, Jul. 23, 1979, Pat. No. 4,297,841.

[51] Int. Cl.³ .............................................. F02C 7/00
[52] U.S. Cl. ..................................... 60/39.05; 60/39.55
[58] Field of Search ............. 60/39.02, 39.05, 39.18 B, 60/39.55; 122/7 R, 7 B

[56] References Cited

U.S. PATENT DOCUMENTS

| | | | |
|---|---|---|---|
| 2,678,531 | 5/1954 | Miller | 60/39.55 |
| 2,869,323 | 1/1959 | Van Nest | 60/39.55 |
| 3,177,659 | 4/1965 | Berman | 60/39.18 B |
| 3,719,172 | 3/1973 | Charcharos et al. | 122/7 R |
| 3,978,661 | 9/1976 | Cheng | 60/39.55 |
| 4,128,994 | 12/1978 | Cheng | 60/39.55 |
| 4,248,039 | 2/1981 | Cheng | 60/39.55 |

Primary Examiner—Louis J. Casaregola
Attorney, Agent, or Firm—J. William Wigert, Jr.

[57] ABSTRACT

The steam control valve for a waste heat boiler in a Cheng Dual Fluid Cycle (DFC) engine is located between the evaporator and superheater sections. In this location it maximizes the temperature of the superheater steam to provide maximum waste heat recovery.

15 Claims, 6 Drawing Figures

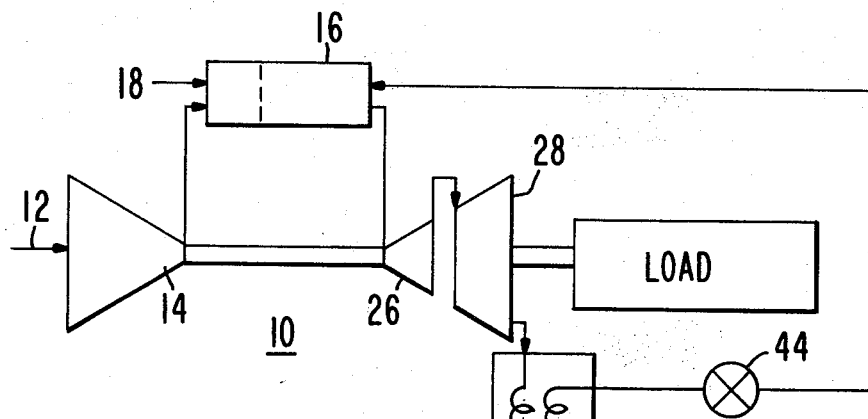
FIG. 1
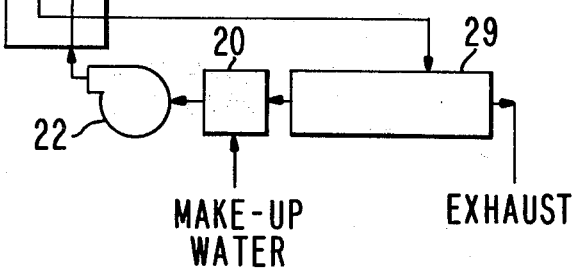
FIG. 2
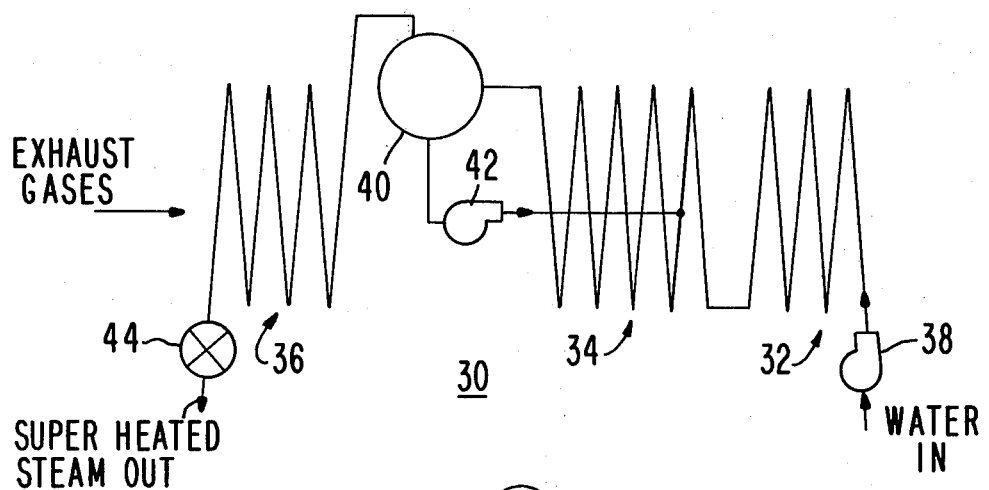
FIG. 3
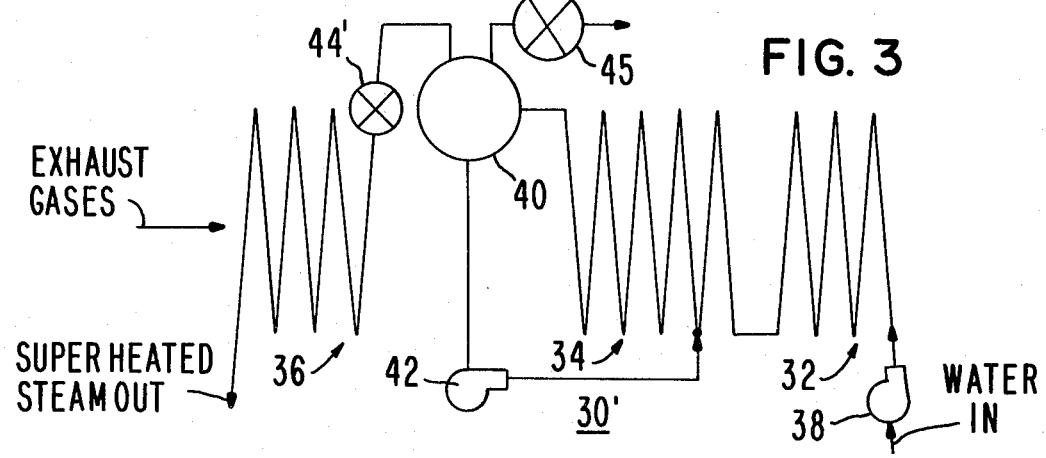

STEAM OUTPUT CONTROL SYSTEM

RELATED APPLICATIONS

This is a continuation-in-part of U.S. patent application Ser. No. 59,591 entitled "Control System for Cheng Dual-Fluid Cycle Engine System," filed July 23, 1979.

BACKGROUND OF THE INVENTION

This invention relates to steam generation control for a waste heat boiler, and in particular for steam control for a waste heat boiler in a Cheng dual fluid cycle (DFC) engine.

Waste heat boilers are used to recover unused or waste heat from engines, typically, gas turbine engines. This is done to increase the over-all system efficiency. More recently a waste heat boiler is used to recover waste heat in the Cheng DFC engine. This engine is described in U.S. Pat. No. 4,128,994 and in U.S. patent application Ser. No. 705,355 both entitled "Regenerative Parallel Compound Dual Fluid Heat Engine." There heat from waste gases is recovered by the waste heat boiler to convert water into superheated steam. The superheated steam, one of the two working fluids, is mixed with the other working fluid, typically gaseous combustion products. Work is provided by the combination of the two working fluids, in a manner which is greater than the sum of the two working fluids individually.

The typical waste heat boiler consists of an economizer, an evaporator, and a superheater. It also incorporates a recirculation pump between the output and input ends of the evaporator to recirculate the water at a much higher rate than it evaporates in the evaporator, guaranteeing good heat transfer.

The steam from the boiler has a control valve at the outlet from the superheater. It is logical and traditional that the steam control valve is located at the output end of the boiler. This control valve normally controls the rate of steam flow, for example, to a steam engine, a steam turbine, or a Cheng DFC engine.

Although this mode of steam control has existed for many years, disadvantages result from the location of the steam control valve at the output of the superheater. This is particularly the case where it is desired to maximize the temperature of the superheated steam, such as in the case of a Cheng DFC engine.

SUMMARY OF THE INVENTION

It is therefore an object of the invention to provide an improved mode of steam regulation for a waste heat boiler.

Another object of the invention is to provide an improved technique for regulating steam from a waste heat boiler for a Cheng DFC heat engine.

In accordance with the invention a control valve is located between the evaporator and superheater sections of the waste heat recovery boiler. Location of the steam control valve in this position, rather than at the output of the superheater, has several important advantages, all important for the Cheng DFC engine.

First, it is possible to increase the temperature of the superheated steam exiting the waste heat boiler. Second, it provides a reservoir of high energy steam in the evaporator which can be quickly tapped thereby providing fast response times to changing load requirements. Third, it affords a method of regulating steam generation rate simply, with relatively low cost equipment, without the hazard of overpressurizing the superheated section of the waste heat boiler.

While prior art steam boilers occasionally may be found having a valving arrangement between the evaporator and superheater sections, the purpose of these valves is other than for main boiler steam control. The main steam control valve is located at the outlet of the superheater.

BRIEF DESCRIPTION OF THE DRAWINGS

FIG. 1 is a block diagram of a Cheng DFC heat engine, with the steam control valve conventionally located.

FIG. 2 is a schematic representation of a conventional waste heat boiler with the steam control valve located at the output of the superheater.

FIG. 3 is a schematic representation of the improved waste heat boiler of the present invention with the steam control valve located between the evaporator and the superheater sections of the waste heat boiler.

DESCRIPTION OF THE PREFERRED EMBODIMENT(S)

Figure 4:
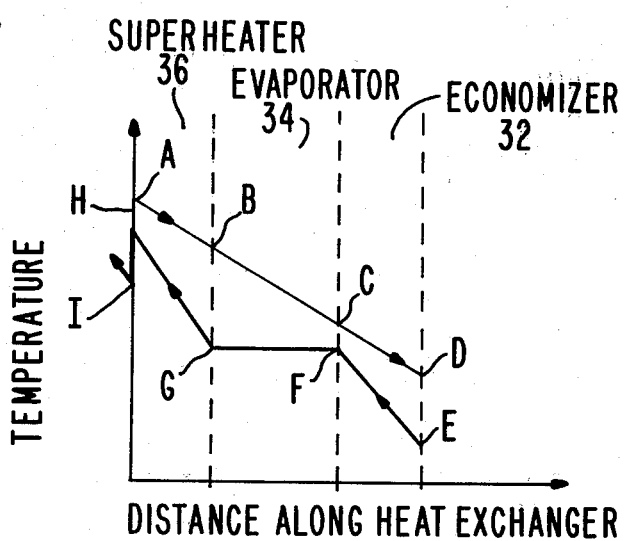
FIG. 4 is a graph showing, for the conventional waste heat boiler of the DFC engine of FIGS. 1 and 2, the temperature profile of the exhaust gases from the DFC engine flowing through the waste heat boiler in one direction and the water/steam passing in the opposite direction.

FIG. 1 is a block diagram of one embodiment of a Cheng dual-fluid cycle heat engine 10. The engine typically uses air as the first working fluid. Fuel combustion with the air is a typical source of energy, and water is a typical second working fluid. Air enters a compressor 14 at 12 where it is adiabatically compressed.

From the compressor 14, the air enters the combustion chamber 16. Fuel is introduced directly into the combustion chamber at 18. Through combustion, heat is added to the air; the combustion products thus heated constitute the first working fluid of heat engine 10.

The first working fluid can be heated in other ways besides combustion; for example, by solar energy or nuclear energy in combination with a heat exchanger in place of the combustor. For the remainder of this description, it is assumed that the first working fluid is heated by combustion.

Water, the second working fluid, is compressed to a high pressure by pump 22. The high pressure water enters waste heat boiler or regenerator 30 where waste exhaust heat is absorbed from the steam/combustion product mixture exhausted from the expander 28. There the water is heated to superheated vapor. Because of the latent heat of evaporation of water, much of the heat absorbed by any water converted to steam is absorbed at essentially constant temperature, i.e. boiling temperature.

The super-heated steam from the regenerator 24 then enters the combustion chamber 16 where it is mixed with the combustion products through turbulent mixing. The amount of superheated steam provided to the combustion chamber 16 is regulated by control valve 44.

The mixture of the two working fluids then enters an expander or core turbine 26, which drives the compressor 14, then enters another expander or work turbine 28. These expanders convert the thermal energy of the two working fluids into mechanical work, to drive the compressor 14 and to produce net work output.

Waste heat boiler 30 is a counter flow heat exchanger used to regenerate the waste heat from the cycle. The gas side of the heat exchanger contains the gas mixture which drops in temperature from the power turbine 28 discharge to a temperature at or above the saturation temperature of the water in the gas mixture. This saturation temperature is a function of the partial pressure of the steam in the gas mixture. On the liquid side of the heat exchanger, water under pressure is heated from approximately ambient temperature to super-heated steam. From the heat exchanger the gas mixture is discharged into condenser 29 or vented.

After any required purification at the water system 20, the proper amount of water is metered and pumped to the liquid side of the heat exchanger for regeneration ahead of the combustor. The remaining water is passed through a cooling tower or other cooling means and then reused in the condenser.

U.S. Pat. No. 4,128,994 and pending U.S. patent application, Ser. No. 967,108, Regenerative Parallel Compound Dual-Fluid Heat Engine, (referred hereinafter collectively as the prior Cheng cycle patent) describe the dual-fluid (Cheng) cycle heat engine in greater detail. This engine, which employs parallel Rankine and Brayton cycles, requires a critical balance of operating parameters to produce high thermal efficiencies. For any given set of cycle parameters, the prior Cheng cycle patent referred to above, teaches that an efficiency peak exists only at a unique ratio of Rankine to Brayton fluids. Either too much or too little Rankine fluid leads to reduced cycle efficiency.

The prior Cheng cycle patent defines the peak operating condition cycle parameters to design an engine for 100 percent load. Because of the parallel combined nature of the Brayton and Rankine cycles in this engine, the quantity and quality of steam that can be generated by a given engine configuration can be varied freely over a range. The control path for the steam cycle is essentially independent of that for the gas turbine cycle. The control path for throttling the engine is essentially free or undefined. Thus to reduce engine power from the peak operating points to reach partial load output conditions poses a difficult control problem that involves precise control of the air flow, fuel flow, and steam flow.

Because of the nature of the parallel compound fluid engine, several independent parameters are defined somewhat arbitrarily by the designer or fixed by some operational constraint, such as synchronous speed of a generator, for example. These include the compression ratio (CPR), turbine inlet temperature (TIT), compressor RPM and work turbine RPM, as well as those determined by the air, fuel and steam flows, which are air-fuel ratio (A/F), specific heat input rate (SHIR), steam-to-air ratio ($X_{mix}$), and total mass flow. Among the constraints on operating this engine at variable load conditions are the boiler surface area, boiler pressures, and the degree of superheat of the steam. Taken together this array of parameters makes design of a control system both difficult and unique. U.S. patent application Ser. No. 059,591 entitled "Control System for Cheng Dual-fluid Cycle Engine System", assigned to the same assignee as this invention, describes a control system for controlling the various engine parameters. That patent is incorporated herein by reference. As described there, one of the important parameters controlled is the rate of steam injected into the combustion chamber.

FIG. 2 illustrates a typical waste heat boiler 30. It is made up of three sections, an economizer 32, an evaporator 34, and a superheater 36. Feedwater pump 38 drives water into the economizer. Since liquid water is almost an incompressible fluid, water pump 38 does not have to do much work to pressurize the water. Steam is produced in the evaporator 34, and then further heated in the superheater 36, by exhaust gases which have exited from the turbine in the DFC engine 10. In FIG. 2 the exhaust gases pass from left to right. Within the evaporator section 34 is a water storage drum 40 and a recirculating water pump 42 to increase liquid side flow velocity and to reduce the vapor-to-liquid ratio at the optimum heat transfer condition.

Steam pressure is controlled in part by the heat transfer surface area, by a control valve, and, if excessive, by a blowoff valve (not shown). To convert steam energy into mechanical energy, steam should be fed into an energy converting device at the highest temperature and pressure economically possible for a given boiler design. Therefore, typically, the control valve 44 is mounted at the outlet of the boiler; that is at the superheater 30 outlet. To operate a steam turbine or a steam engine under partial load conditions, the rate of steam flow is throttled back by the control valve 44. Typically, the steam turbine operates at a constant RPM; therefore, a governor control will be used ordinarily to keep the steam turbine at a constant RPM.

The waste heat boiler designed for a dual fluid cycle engine to recover waste heat from the turbine exhaust operates at a very critical steam-to-air flow ratio. In order to control the partial load of the turbine so as to reach all the peak steam-air flow ratio conditions, the steam must not only be critically metered according to the load, but it must be at the highest super heat condition. This becomes a very difficult task for the ordinary boiler steam control, as shown in FIG. 2, because thermal lag involved in the boiler system with such a large heated mass retards the response when more steam is needed. Conversely, the thermal inertia slows down the response to reduced load because the stored thermal energy in the steam has to be dissipated.

FIG. 3 shows an improved waste heat boiler 30' which is the waste heat boiler 30 of FIG. 2 but with a steam control valve 44 located between the evaporator 34 and superheater 36 sections instead of at the output of the superheater 36. This valve location enables the superheater to achieve high superheat and facilitates operating on the peak efficiency points of a dual fluid cycle engine. Throttling the control valve 44 causes the boiler pressure in the evaporator to be higher. Ordinarily, the design surface area of the boiler sections are determined by the maximum (design) power operating conditions. At this point heat transfer has to be balanced out through all three sections of the heat exchanger 30. A steam valve located at the outlet of the superheater as shown in FIG. 2 does not give the steam conditions needed to operate a dual fluid cycle engine at peak efficiency at partial load. With the new location of the control valve, the boiler evaporator section pressure is higher under throttled conditions in spite of the fact that the area of the evaporator is excessive to the steaming requirements of throttled operation. The steaming rate is reduced by the reduced temperature difference between the heat transfer media and the steam control valve provides a self adjusting heat transfer mechanism by means of the pressure drop used to control the steam flow rate.

The advantage of this control system are multiple: Throttling can be immediate simply by throttling back the steam, thus causing the pressure in the evaporator to build up. When it is necessary to accept increased load for the engine, higher pressure steam is available as stored in the drum to give an instantaneous steam supply without the addition of heat momentarily to the superheater; concurrently, additional exhaust gas heat from the engine increases the temperature of the steam in the superheater to provide the appropriate degree of superheat for high efficiency operating conditions.

Another advantage of this control system is found during co-generation mode: when the engine system is providing additional steam for some process external to the engine. This is described in greater detail in parent patent application Ser. No. 59,591. A valve 45 allows steam to be drawn from drum 40 at high pressure, which is most useful for co-generation purposes. At the same time the remaining steam, at lower pressure, can still be heated by the turbine exhaust gas in the superheater section 36 to its highest enthalpy, only limited by the surface area of the superheater and thermodynamic constraints.

A more detailed explanation of the advantages of the waste heat boiler steam control is now given. There are thermodynamic and mechanical advantages. Additionally, the character of the waste heat boiler, in terms of its response to changing load conditions is also favorably affected.

Thermodynamic Advantages

FIG. 4 shows the temperature profile across the waste heat boiler 30 of FIG. 2. The lower curve is the temperature of the water/steam as it passes from right to left through the boiler 30. The temperature of the exhaust gas from the DFC engine turbine is the top curve. The gas moves from left to right in FIG. 4. The temperatures designated in FIG. 4 are:

A = temperature of turbine exhaust gases entering superheater 36
B = temperature of exhaust gases passing into the evaporator 34
C = temperature of the exhaust gases passing into the economizer 32
D = temperature of exhaust gases passing out of the waste heat boiler 30.
E = temperature of water leaving pump 38 and entering the economizer 32
F = temperature of water leaving economizer 32 and entering evaporator 34
G = temperature of steam leaving evaporator 34
H = temperature of steam at input into control valve 44
I = temperature of steam at output of control valve 44

Figure 5:
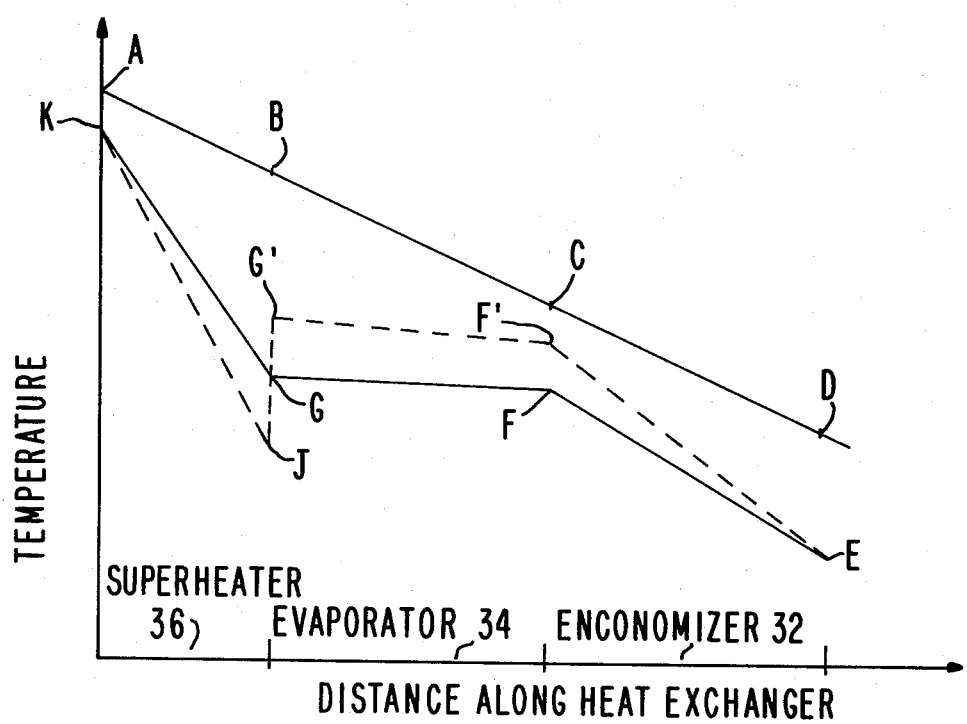
FIG. 5 is a graph showing, for the improved waste heat boiler design of FIG. 3, the temperature profile of the exhaust gases of the DFC engine flowing through the waste heat boiler in one direction and the water/steam passing in the opposite direction.

FIG. 5 is a graph showing the temperature profile of the water heat boiler 30'. The specific temperature designated there are the same as for FIG. 4, where applicable. Additional or different designated temperatures are:

J = temperature of steam at the output of steam control valve 44'
K = temperature of superheated steam at output of superheater 36'

A comparison of these two figures will demonstrate the thermodynamic advantage of locating the steam control valve between the evaporator and superheater sections. Assume, for example, that the boiler is designed and operated at 450 psia at maximum load. In the case of the prior art steam boiler, the temperature of the steam from the evaporator 34, G, first rises to H, then falls as it passes through valve 44 to I. In contrast, the steam temperature path, FIG. 5, is from G, down to J, and then to K. While there is also a temperature drop across valve 44' because of its throttling effect, the steam is heated back up to the desired temperature K which is higher than the temperature I in the case of the conventional steam control valve location of FIG. 2.

Figure 6:
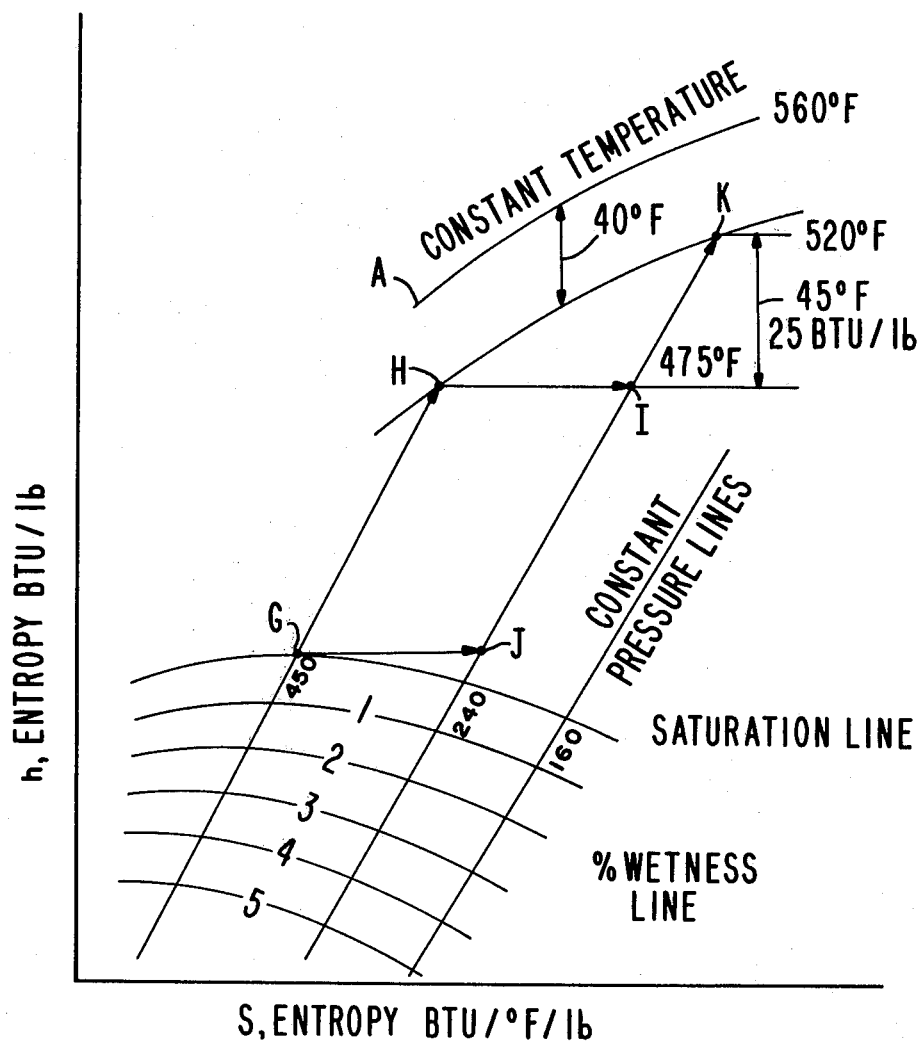
FIG. 6 illustrates graphically the thermodynamic properties of steam for both the conventional waste heat boiler steam control and the improved one of the present invention.

The quantitative difference in temperature is shown in FIG. 6. In the case of the DFC engine it is desired that the vapor working fluid (steam) reach the highest temperature (enthalpy) possible within engineering feasibility. For a given exhaust gas temperature, A, assume the steam exiting the superheater 36 can reach a temperature 40° F. below that of the incoming turbine exhaust gases. This limitation is not a physical one but an engineering one. As this temperature difference is made smaller, the surface area of the superheater 35 increases and approaches infinity as the temperature difference goes to zero. If, as an example, the exhaust gas temperature is 560° F., then the maximum steam temperature is 520° F. Due to the throttling of valve 44 at the high temperature state H, the superheated steam temperature drops to 475° F., state I. In the case of the improved waste heat boiler the temperature also drops from state G to state J because of the throttling effect of control valve 44'. However, the steam is eventually heated up to the desired temperature of 520° F. at state K. As a result the temperature of the superheated steam is 45° F. higher and the waste heat boiler 30' of FIG. 4 recovers 25 Btu/lb. more waste heat enthalpy than otherwise. The initial temperature drop from state G to J helps to increase the log mean temperature difference, hence does not require excessive surface area of the superheater 36.

Mechanical Advantages

The Cheng DFC engine utilizes steam at very high temperatures at highly superheated states. If the DFC has a turbine inlet temperature of 2150° F., and a compression ratio of 18 to 1, the turbine exhaust gas temperature will be on the order of 1000° F. or more. The desired steam temperature before the injection into the combustion chamber will be on the order of 959° F. At that temperature, a steam control valve has to use high temperature materials such as stainless steel. The size of the valve is large because the specific volume of the steam at high temperature is large.

Because of its location at the inlet rather than outlet of the superheater 36, the steam control valve 36 throttles the steam in the neighborhood of steam saturation temperature so the material requrement is relaxed plus the specific volume is relatively small. Hence a smaller physical size of the throttle valve can be used. This reduces the cost and maintenance of the control system.

Changing Character of the Control System and Energy Storage

This new invention also changes the characteristics of the boiler system. In a conventional boiler system, the response time of the boiler to produce steam is very slow, due to its large mass, i.e., thermal inertial. Under partial load conditions, the boiler generally has excess surface area in the evaporator 34. The conventional control allows hot water to be wasted through a blowdown process or by bleeding steam for cogeneration. When power is needed, the boiler requires a time lag to come up with the right amount of steam.

When a control valve 44' is located between the evaporator 34 and the superheaer 36, these conventional ways to deal with excessive surface area are available. Additionally, a new alternative is available. This is to allow the drum 40 pressure to increase by throttling back on control valve 44'. When the drum 40 pressure increases, the boiling temperature is also increased. This is shown by the increased temperature, in the evaporator 34, of states F' and G' but the heat transfer rate Q is equal to heat transfer coefficient U times the surface area A times the log mean temperature differences. The log mean temperature in this case is $$T_{lm} = \frac{(T_B - T_G) - (T_C - T_F)}{\log_e\left(1 + \frac{T_C - T_F}{T_B - T_G}\right)}$$

where $T_B'$ is the temperature of the exhaust gases at state G' where $T_C'$ is the temperature of the exhaust gases at state F'

In FIG. 6, one can see that the temperature profile self limits the heat transfer to the evaporator. The high pressure steam stored in the drum stores high quality thermal energy, in the form of high energy containing steam, which can be tapped by opening up the control valve 30' instead of waiting for the slow steam build up due to thermal lag. This cuts down the response time of the dual fluid cycle engine by a large margin such that rapid acceleration and fast response time is obtained without overheating the engine components.

While the advantages of the invention have been described in terms of a Cheng dual fluid cycle engine, it has application elsewhere. For example, it can be used for steam injection of a gas turbine, where the amount of steam injected does not follow that prescribed by the Cheng DFC engine. The invention is also applicable to other engine systems where heat is recycled through steam regeneration. In other words if heat is recovered by water/steam the steam control valve location is appliable, regardless of the source of waste heat or the use which is made of the regenerated steam.

To summarize, the prior art has a control valve at the outlet of the waste heat boiler. The superheater has the same pressure as the steam drum. The boiler operates at approximately constant pressure in the evaporator sections. Uniquely, the present invention has a control valve between the evaporator and superheater. The pressure in the drum is used as an energy storage system to adjust the evaporator temperature difference between the exhaust gases and the steam. This controlsystem has rapid response for steam supply. It also provides maximum superheat temperatures available to provide the steam quality required for efficient operation of a DFC engine system.

What is claimed is:

1. A heat engine comprising a dual fluid cycle engine having a counterflow heat exchanger, comprising at least an evaporator and a superheater section, for recovering waste heat from the engine exhaust gases to evaporator water into superheated steam for mixing with the engine combustion products, and having means for regulating the steam generation rate comprising a control valve located between the evaporator and superheater sections of the heat exchanger.

2. A method of regulating the amount of superheated steam from the waste heat boiler in a dual-fluid cycle engine comprising the step of regulating a control valve located between the evaporator and superheater sections of the waste heat boiler.

3. The method of claim 2 including the step of storing high energy steam within the evaporator section of the waste heat boiler by throttling said control valve.

4. The method of claim 3 including the subsequent step of opening said control valve to provide high energy steam to said engine within a comparatively short period of time in response to engine output power demand.

5. The method of claim 3 including the subsequent step of regulating said control valve to compensate for short term variations in engine output power demand.

6. A control system for a dual-fluid cycle engine, which includes a waste heat boiler for recovering waste heat from the engine exhaust gases, comprising control means for following a control path defined by the locus of peak efficiency points at reduced loads, where the control path results in a declining turbine inlet temperature as the load decreases, and wherein said control means comprises:
(a) a first control system for controlling the Brayton cycle part of the dual-fluid cycle engine;
(b) a second control system for controlling the Rankine part of the dual-fluid cycle engine;
(c) memory means for setting the desired operating points of said first and second control systems, where the memory means contains predetermined settings for each of the two control system for all load conditions; and
(d) means for regulating the Rankine cycle working fluid comprising a valve between the superheater and evaporator sections of the waste heat boiler.

7. A control system as in claim 6 wherein said predetermined settings comprise at least fuel flow rates and water flow rates.

8. In a dual-fluid heat engine comprising:
a chamber;
compressor means for introducing a first gaseous working fluid into said chamber, said compressor means having a predetermined pressure ratio (CPR);
means for introducing a second liquid-vapor working fluid in the form of a vapor within said chamber at a defined second/first working fluid ratio (XMIX);
means for heating said first gaseous working fluid and said second working fluid in the vapor form in said chamber at a defined specific heat input rate (SHIR);
turbine means responsive to the mixture of said first and second working fluids for converting the energy associated with the mixture to mechanical energy, the temperature of said mixture entering said turbine means defining the turbine inlet temperature (TIT);

counterflow heat exchanger means including at least superheater and evaporator sections for transfering residual thermal energy from said exhausted mixture of first and second working fluids to said incoming second working fluid to thereby preheat the same to a superheated vapor state prior to its introduction within said chamber, and wherein XMIX and SHIR are selected so that for a given value of TIT, XMIX is substantially equal to or is greater than $XMIX_{peak}$, where $XMIX_{peak}$ occurs when the following conditions are both met simultaneously:

(i) the temperature of the superheated second working fluid vapor is substantially maximized;

(ii) the effective temperature of said exhausted mixture of the first and second working fluids is substantially minimized; and wherein the improvement comprises control means for controlling XMIX and SHIR along a maximum efficiency path as engine load varies such that as engine loads decrease, TIT is reduced, said control means including a valve located between the superheater and evaporator sections of said counterflow heat exchange means.

9. A heat engine as in claim 8 wherein said control means includes a memory means wherein predetermined operating parameters are stored for substantially all load conditions, said operating parameters including SHIR and XMIX.

10. A heat engine as in claim 8 wherein said control means includes a memory, said memory storing predetermined information as to desired flow rates of said first and second working fluids and SHIR, for partial and over-load engine conditions.

11. A heat engine as in claim 8 wherein said control means comprises:
(a) memory means,
(b) a first servo control system for controlling SHIR;
(c) a second servo control system for controlling XMIX; and
wherein said memory means is provided with predetermined control operating parameters for providing a setting, for said first and second servo control systems, for overload and partial load requirements.

12. A heat engine as in claims 8, 9, 10 or 11 wherein said second working fluid comprises water.

13. A heat engine as in claims 8, 9, 10 or 11 wherein said second working fluid comprises water and said first working fluid comprises air and combustion products.

14. A heat engine as in claim 8 wherein said evaporator section includes a water storage drum, and a co-generation valve is provided to allow high pressure steam to be drawn from said water storage drum for co-generation purposes.

15. The method of operating a dual-fluid heat engine at partial load conditions, which engine comprises:
a chamber;
compressor means for introducing a first gaseous working fluid into said chamber, said compressor means having a predetermined pressure ratio (CPR);
means for introducing a second liquid-vapor working fluid comprising water in the form of superheated steam within said chamber at a defined second/first working fluid ratio (XMIX);
means for heating said first gaseous working fluid and said second working fluid in the vapor form in said chamber at a defined specific heat input rate (SHIR);
turbine means responsive to the mixture of said first and second working fluids for converting the energy associated with the mixture to mechanical energy, the temperature of said mixture entering said turbine means defining the turbine inlet temperature (TIT);
counterflow heat exchanger including at least superheater and evaporator sections means for transfering residual thermal energy from said exhausted mixture of first and second working fluids to said incoming second working fluid,
said method comprising the steps of:
preheating the second working fluid in the heat exchanger to a superheated vapor state prior to its introduction within the chamber; and
selecting XMIX and SHIR so that:
(a) for a given value of TIT, XMIX is substantially equal to or is greater than $XMIX_{peak}$, where $XMIX_{peak}$ occurs by both
(i) maximizing the temperature of the superheated second working fluid vapor; and
(ii) minimizing the effective temperature of the exhausted mixture of the first and second working fluids; and
(b) TIT decreases as engine load decreases; and
regulating a control valve located between the evaporator and superheater sections of the waste heat boiler for regulating XMIX.

* * * * *